United States Patent
Fujinaka (10) Patent No.: US 12,105,346 B2
(45) Date of Patent: Oct. 1, 2024

(54) LENS BARREL AND IMAGING DEVICE COMPRISING SAME

(71) Applicant: Panasonic Intellectual Property Management Co., Ltd., Osaka (JP)

(72) Inventor: Hiroyasu Fujinaka, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 865 days.

(21) Appl. No.: 17/058,252

(22) PCT Filed: Jun. 10, 2019

(86) PCT No.: PCT/JP2019/022917
§ 371 (c)(1),
(2) Date: Nov. 24, 2020

(87) PCT Pub. No.: WO2019/240076
PCT Pub. Date: Dec. 19, 2019

(65) Prior Publication Data
US 2021/0157089 A1    May 27, 2021

(30) Foreign Application Priority Data
Jun. 13, 2018    (JP) .................. 2018-112690

(51) Int. Cl.
*G02B 7/04* (2021.01)
*F16C 19/50* (2006.01)
(Continued)

(52) U.S. Cl.
CPC ................ *G02B 7/04* (2013.01); *F16C 19/50* (2013.01); *F16C 29/04* (2013.01); *G02B 7/026* (2013.01);
(Continued)

(58) Field of Classification Search
CPC ........ G02B 7/04; G02B 7/026; G02B 27/646; G02B 7/021; G02B 7/08; G02B 15/14;
(Continued)

(56) References Cited

U.S. PATENT DOCUMENTS 5,644,440 A * 7/1997 Akada ................ G02B 7/08
359/811
8,004,779 B2   8/2011 Furuya
(Continued)

FOREIGN PATENT DOCUMENTS

JP    S62-008340 A    1/1987
JP    H05-096913 A    4/1993
(Continued)

OTHER PUBLICATIONS

Extended European Search Report for Corresponding Application No. 19820289.7 dated May 17, 2021.
(Continued)

*Primary Examiner* — Thomas K Pham
*Assistant Examiner* — Kuei-Jen L Edenfield
(74) *Attorney, Agent, or Firm* — Renner, Otto, Boisselle & Sklar, LLP (57) ABSTRACT

A lens barrel (10) comprises a holding frame (51); a guide pole (53); a focusing lens unit (52) that is slidably guided by the guide pole (53) and moves in an axial direction; an actuator that moves the focusing lens unit (52) in the axial direction relative to the holding frame (51); and leaf springs (55) that support the guide pole (53) so as to allow movement in the axial direction relative to the holding frame (51), at an amplitude smaller than the stroke of the focusing lens unit (52).

12 Claims, 11 Drawing Sheets

(51) Int. Cl.
*F16C 29/04* (2006.01)
*G02B 7/02* (2021.01)
*G02B 27/64* (2006.01)
*G03B 17/14* (2021.01)
*H02K 41/02* (2006.01)

(52) U.S. Cl.
CPC .............. *G03B 17/14* (2013.01); *H02K 41/02* (2013.01); *G02B 27/646* (2013.01)

(58) Field of Classification Search
CPC ........ G02B 27/00; G02B 15/20; G02B 27/64; G02B 7/02; F16C 19/50; F16C 29/04; F16C 2206/00; F16C 2322/39; F16C 29/004; F16C 33/32; F16C 2370/20; F16C 29/00; G03B 17/14; G03B 17/12; G03B 2205/0046; G03B 2205/0053; G03B 3/10; G03B 5/00; H02K 41/02
USPC ........ 359/822–824, 694, 696–698, 703–704, 359/813–814, 822–826
See application file for complete search history.

(56) References Cited

U.S. PATENT DOCUMENTS

| | | |
|---|---|---|
| 8,687,285 B2 | 4/2014 | Yumiki et al. |
| 10,782,502 B2 | 9/2020 | Miyazawa |
| 2002/0075571 A1* | 6/2002 | Chikami ................ G02B 7/102 |
| | | 359/701 |
| 2007/0091463 A1 | 4/2007 | Paik et al. |
| 2009/0072664 A1* | 3/2009 | Nagata ................... H05K 1/189 |
| | | 310/323.02 |
| 2009/0086344 A1 | 4/2009 | Furuya |
| 2011/0026150 A1* | 2/2011 | Shyu ........................ G02B 7/08 |
| | | 359/824 |
| 2011/0141340 A1 | 6/2011 | Yumiki |
| 2015/0200610 A1* | 7/2015 | Yamasaki .............. H02N 2/001 |
| | | 310/323.05 |
| 2016/0202445 A1 | 7/2016 | Yamamoto |
| 2019/0271825 A1* | 9/2019 | Kawanabe ............... G02B 7/02 |
| 2019/0293901 A1 | 9/2019 | Miyazawa |

FOREIGN PATENT DOCUMENTS

| | | |
|---|---|---|
| JP | H05-334690 A | 12/1993 |
| JP | 2004-046234 A | 2/2004 |
| JP | 2007-318851 A | 12/2007 |
| JP | 2009-080329 A | 4/2009 |
| JP | 2009-128500 A | 6/2009 |
| JP | 2015-191123 A | 11/2015 |
| JP | 2017-044972 A | 3/2017 |
| JP | 2018-072775 A | 5/2018 |
| WO | 2008/139723 A1 | 11/2008 |
| WO | 2018/079221 A1 | 5/2018 |

OTHER PUBLICATIONS

International Search Report for corresponding Application No. PCT/JP2019/022917, mailed Aug. 13, 2019.

* cited by examiner

LENS BARREL AND IMAGING DEVICE COMPRISING SAME

TECHNICAL FIELD

The present disclosure relates to a lens barrel and to an imaging device comprising the same.

BACKGROUND ART

There are conventional lens barrels comprising a guide bar (guide pole) that movably supports a group moving frame (an example of a movable frame) in the optical axis direction, a group moving frame (an example of a movable frame) that holds a lens group, and a group lens barrel (an example of a holding frame) that holds the guide (for example, Patent Literature 1).

Also, there is a known lens barrel having, as an actuator for relatively moving a movable frame in the axial direction, an actuator that comprises a stepping motor and a lead screw portion provided integrally to the rotation shaft of the stepping motor, in which the configuration is such that a screw member engaged with a zoom lens movable frame (an example of a movable frame) is threaded onto the lead screw portion, so that the zoom lens movable frame (an example of a movable frame) is driven along a guide pole (an example of a shaft) in the optical axis direction (for example, Patent Literature 2).

CITATION LIST

Patent Literature

Patent Literature 1: JP-A 2015-191123
Patent Literature 2: JP-A 2004-46234

SUMMARY

Technical Problem

The number of pixels of the imaging elements used in imaging devices has been increasing in recent years. At the same time, monitors for viewing captured images are also becoming higher definition and have larger screens.

As the number of pixels in the imaging elements increases or the definition of monitors used to view images increases, it becomes possible to perceive a level of focal shift that was imperceptible in the past, so it becomes necessary for the lens that performs focussing to be positioned at a finer pitch and a higher accuracy than in the past.

With the above-mentioned conventional lens barrel, even if an attempt is made to control the position of the lens at a fine pitch, there is a region where this is not entirely possible due to friction between the guide pole and the lens frame, and a problem is that positioning cannot be performed above a certain degree of accuracy.

The present disclosure provides a lens barrel with which the influence of friction between the lens frame and the guide pole can be reduced, and the lens frame can be positioned at a finer pitch and higher accuracy than before, as well as an imaging device equipped with this lens barrel.

Solution to Problem

The lens barrel according to the present disclosure comprises a support frame, a shaft, a movable frame that is slidably guided by the shaft and moves in the axial direction, an actuator that moves the movable frame in the axial direction relative to the support frame, and support portions that movably support the shaft with respect to the support frame at an amplitude smaller than the maximum amplitude at which the movable frame is relatively moved in the axial direction.

Advantageous Effects

The lens barrel according to the present disclosure affords highly accurate positioning at a fine pitch.

DESCRIPTION OF EMBODIMENTS

Embodiments will be described in detail with reference to the drawings as needed. However, some unnecessarily detailed description may be omitted. For example, detailed description of already known facts or redundant description of components that are substantially the same may be omitted. This is to avoid unnecessary repetition in the following description, and facilitate an understanding on the part of a person skilled in the art.

The inventors have provided the appended drawings and the following description so that a person skilled in the art might fully understand this disclosure, but do not intend for these to limit what is discussed in the patent claims.

Also, when the phrase "substantially . . . " is used, such as when something is said to be "substantially the same," this is intended to include not only things that are exactly the same, but also those that are substantially the same. The same applies to the phrases "near . . . " and "approximately . . . "

It should be noted that the drawings are not necessarily exactly illustrated. Also, in the drawings, components that are substantially the same are numbered the same, and redundant description will be omitted or simplified.

Embodiment 1

The configurations of the lens barrel 10 according to Embodiment 1 and the imaging device 1 equipped with this lens barrel will now be described with reference to FIGS. 1 to 9.

Figure 1:
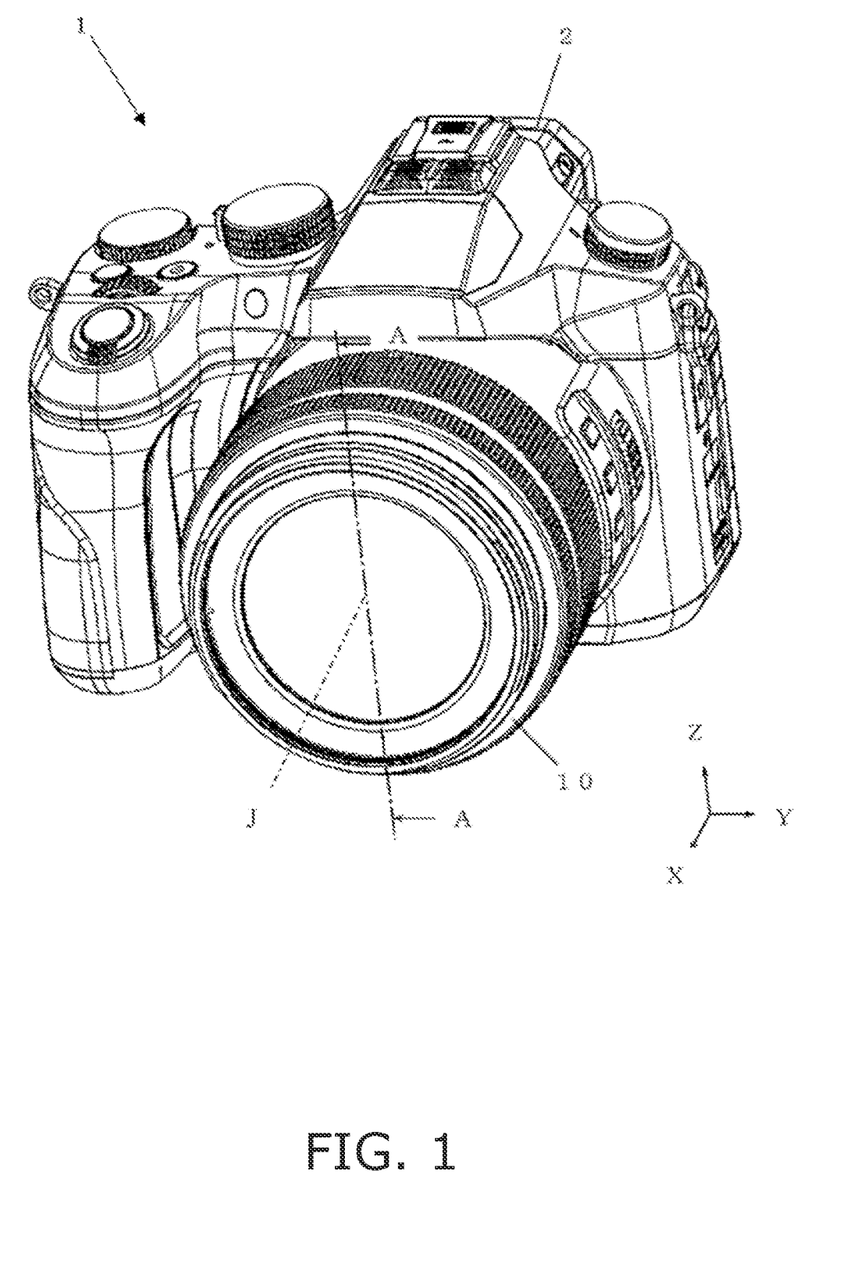
FIG. 1 is an oblique view of an imaging device according to Embodiment 1.
Figure 2:
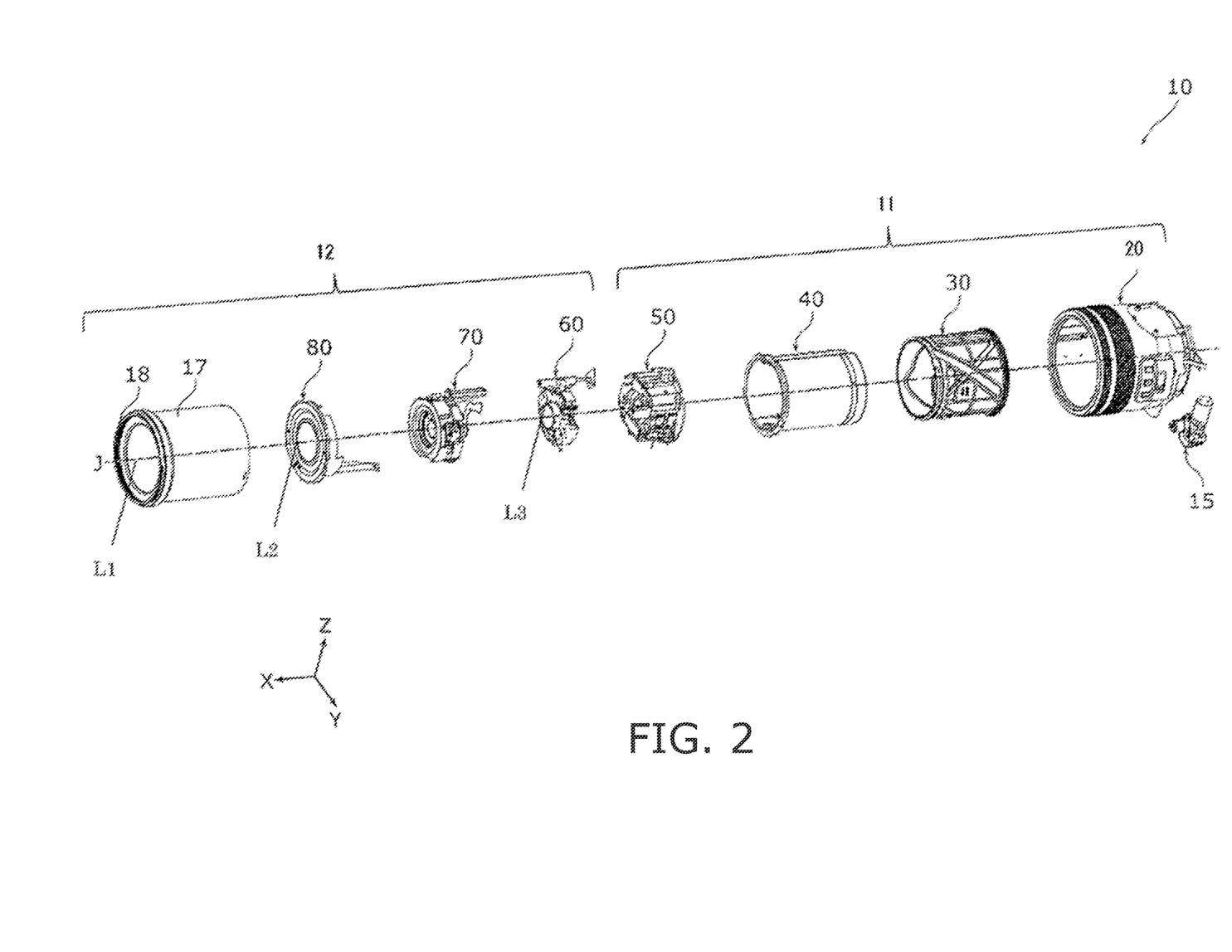
FIG. 2 is an exploded oblique view of a lens barrel in the imaging device according to Embodiment 1.
Figure 3:
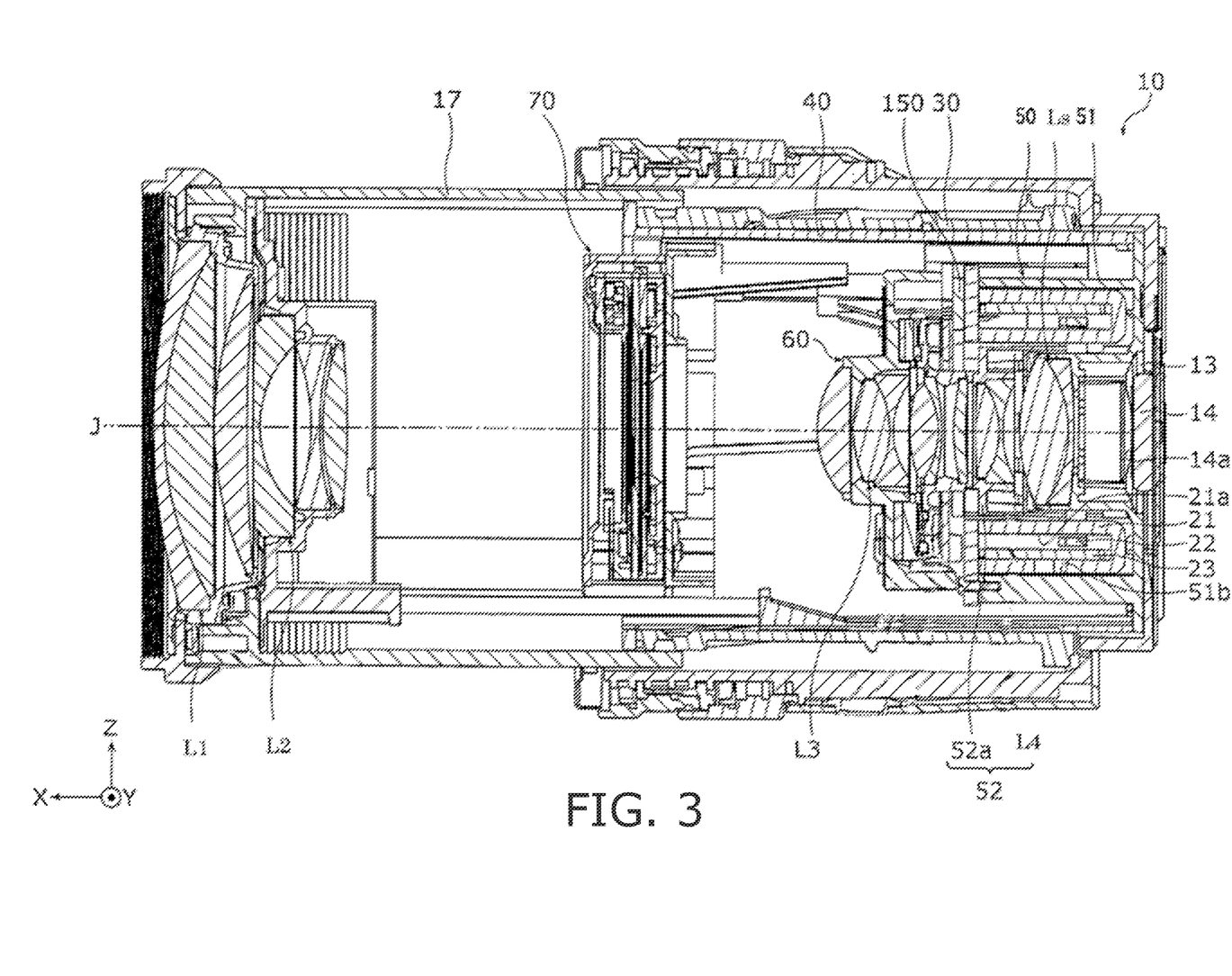
FIG. 3 is a cross section of the lens barrel according to Embodiment 1 along the A-A line in FIG. 1.
Figure 4:
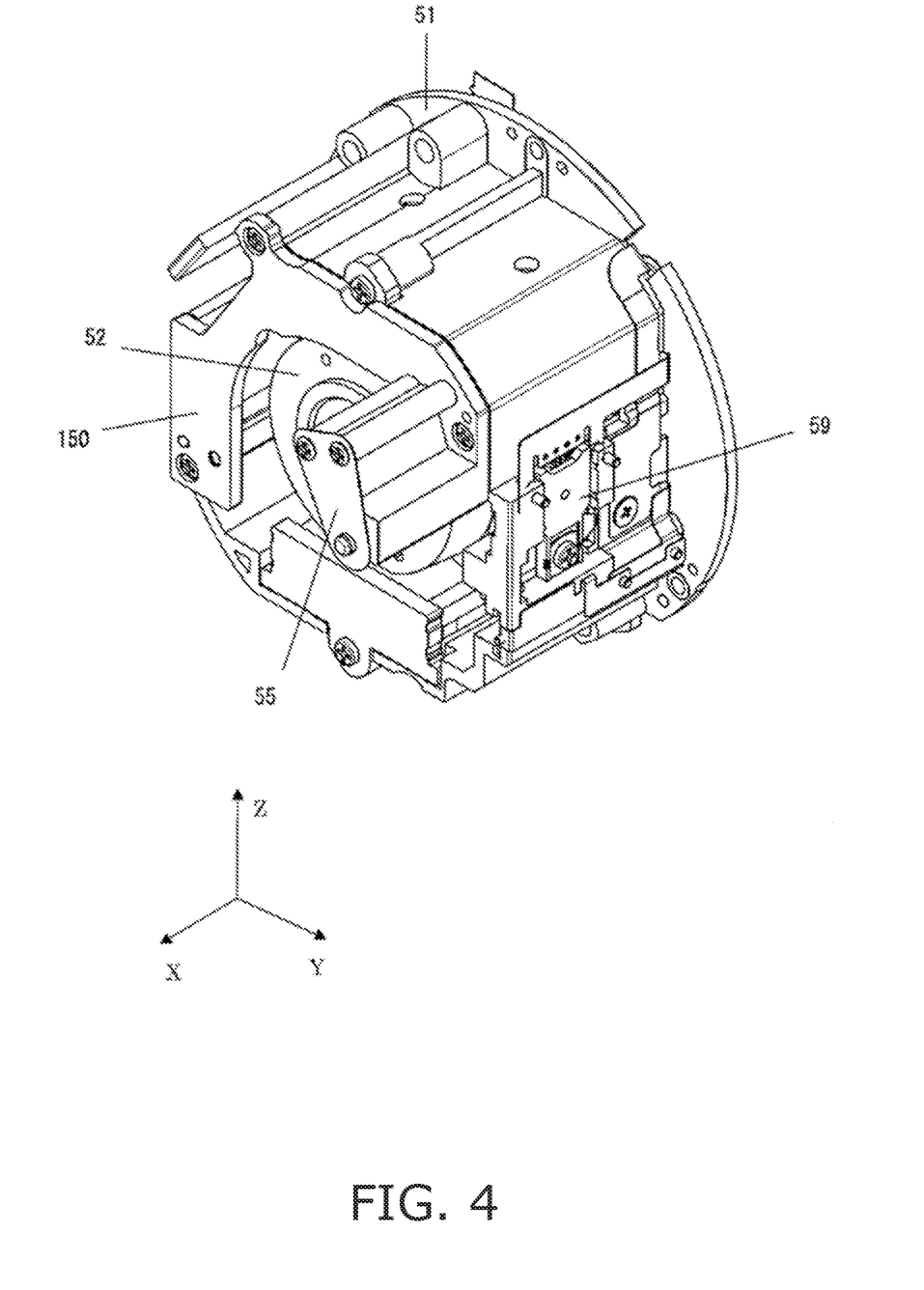
FIG. 4 is an oblique view of a focus unit of the lens barrel according to Embodiment 1.
Figure 5:
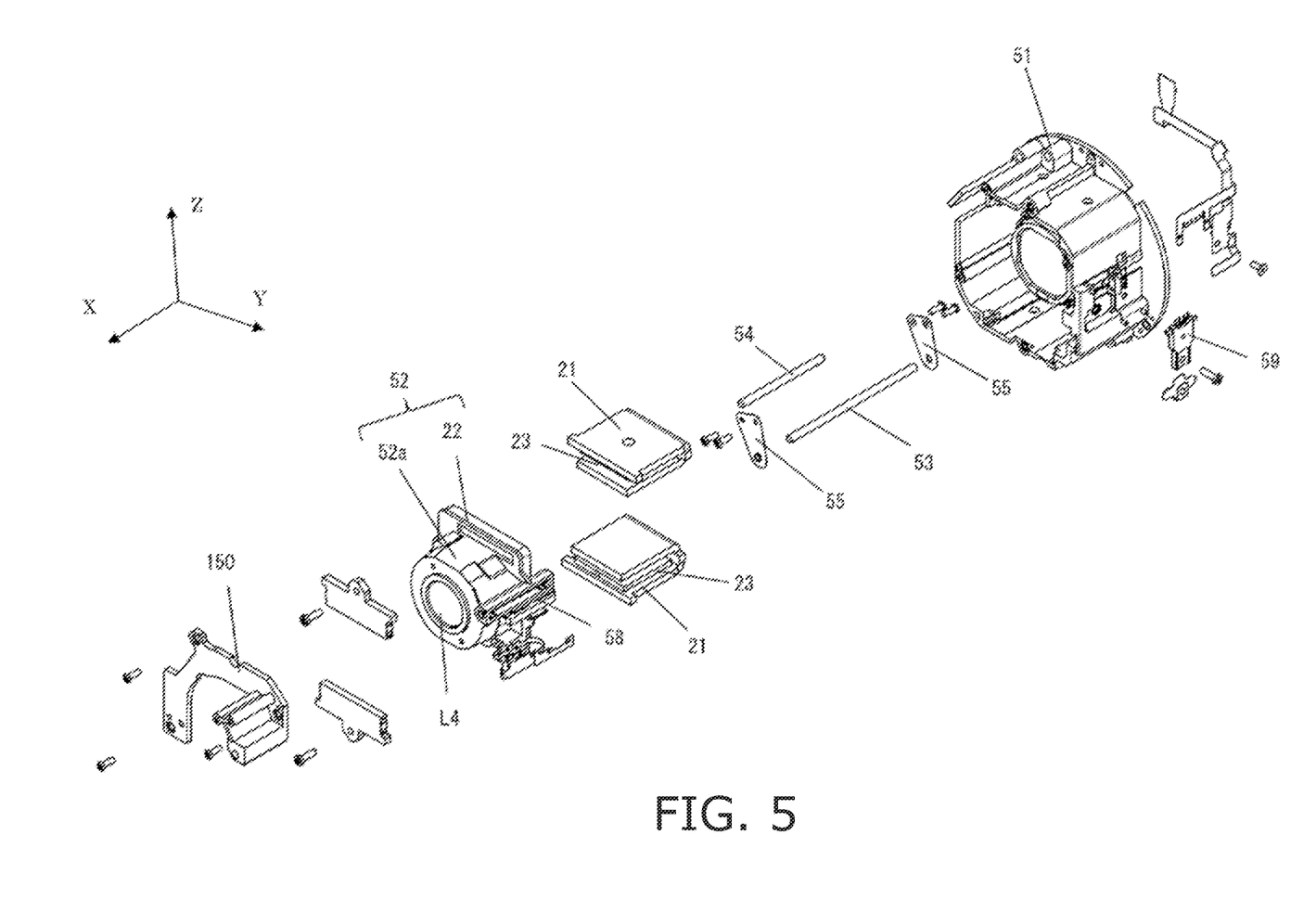
FIG. 5 is an exploded oblique view of the focus unit according to Embodiment 1.
Figure 6:
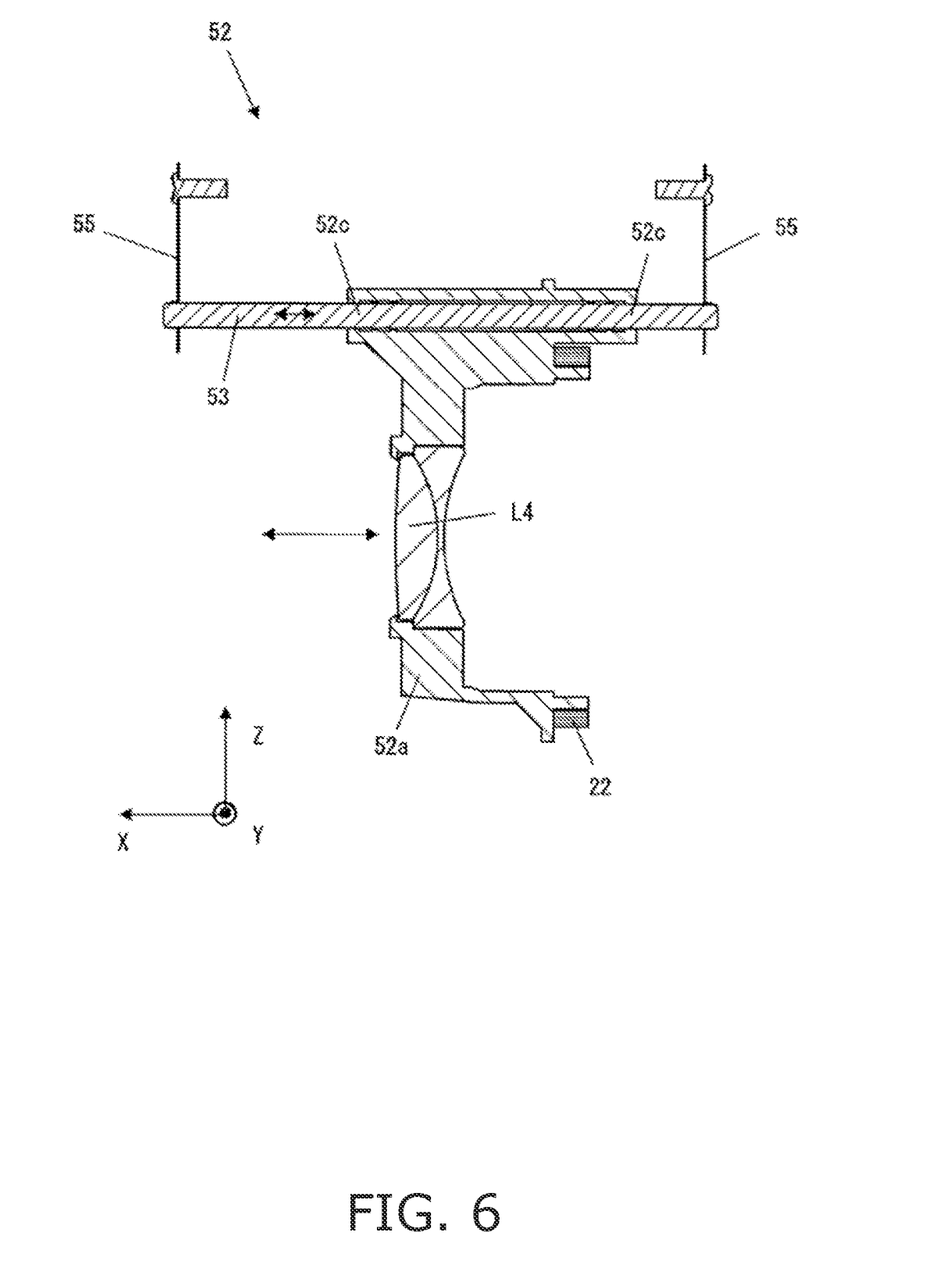
FIG. 6 is a cross sectional of the configuration of a focus lens unit and a guide pole according to Embodiment 1.
Figure 7A:
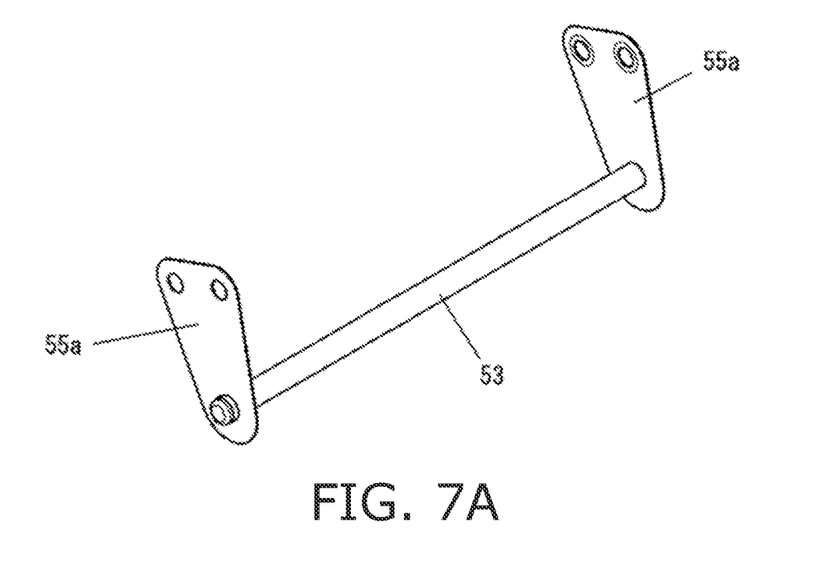
FIG. 7A is an oblique view of the shape of a leaf spring.
Figure 7B:
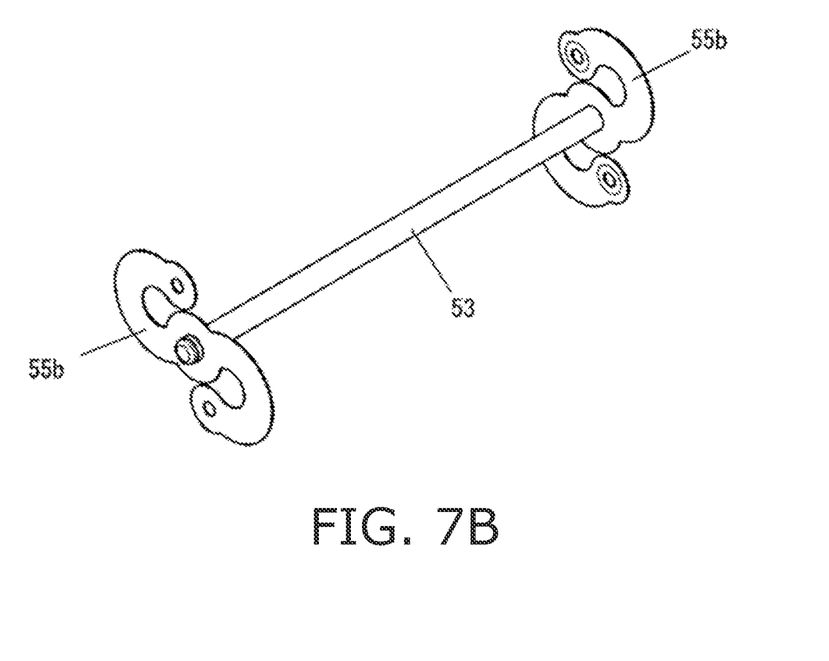
FIG. 7B is an oblique view of the shape of a leaf spring.
Figure 7C:
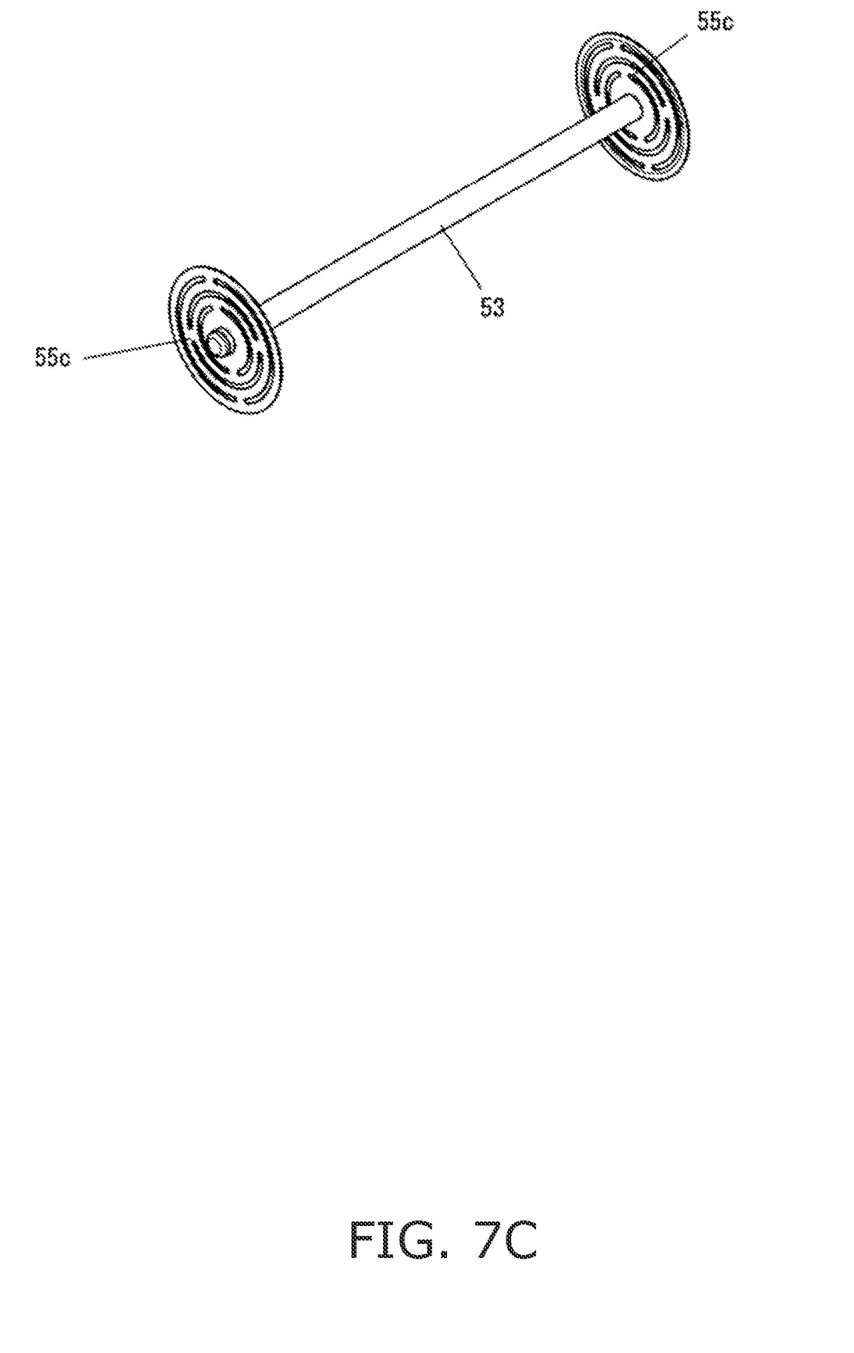
FIG. 7C is an oblique view of the shape of a leaf spring.
Figure 8:
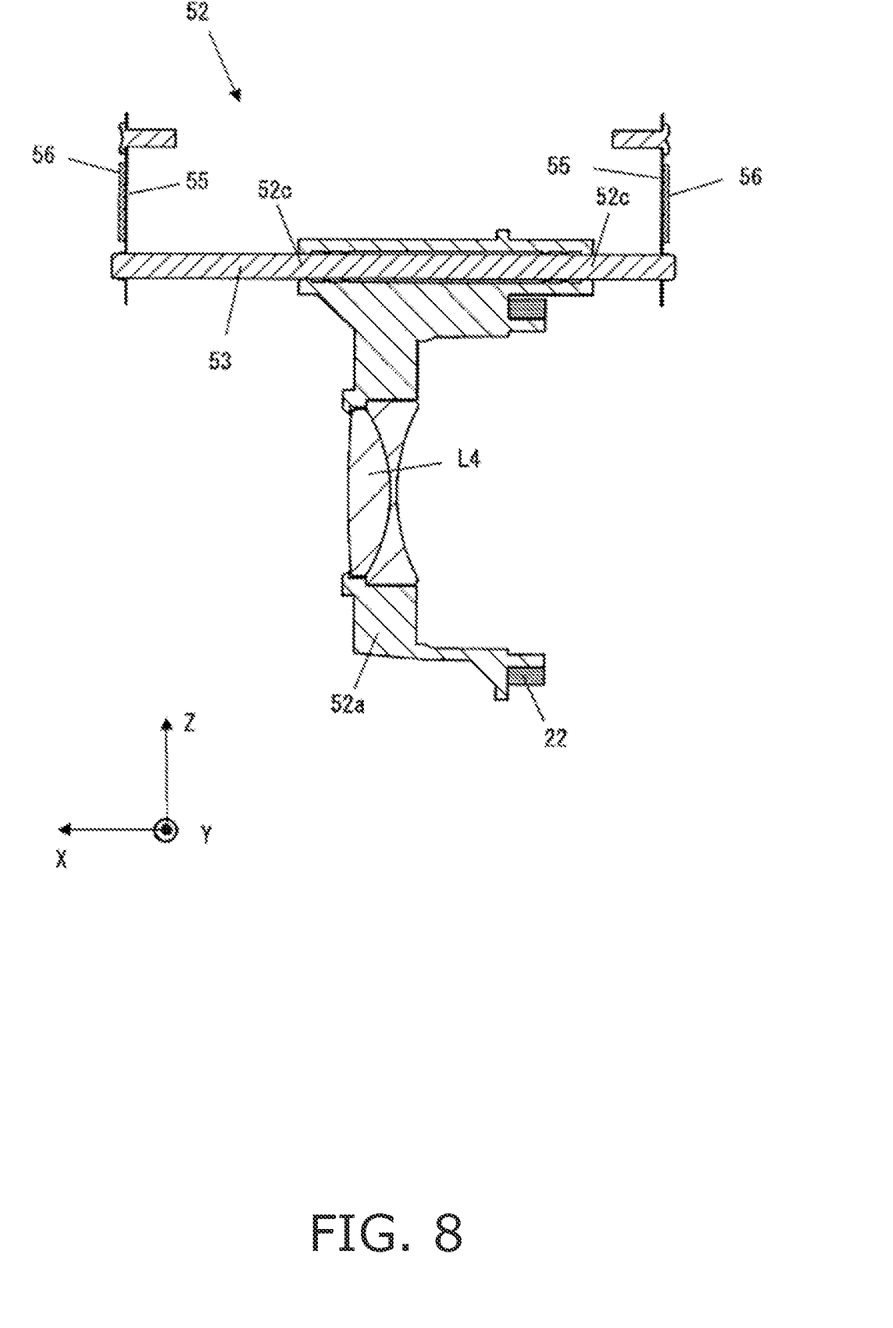
FIG. 8 is a cross section of the configuration of the focus lens unit and the guide pole in a countermeasure example according to Embodiment 1.
Figure 9:
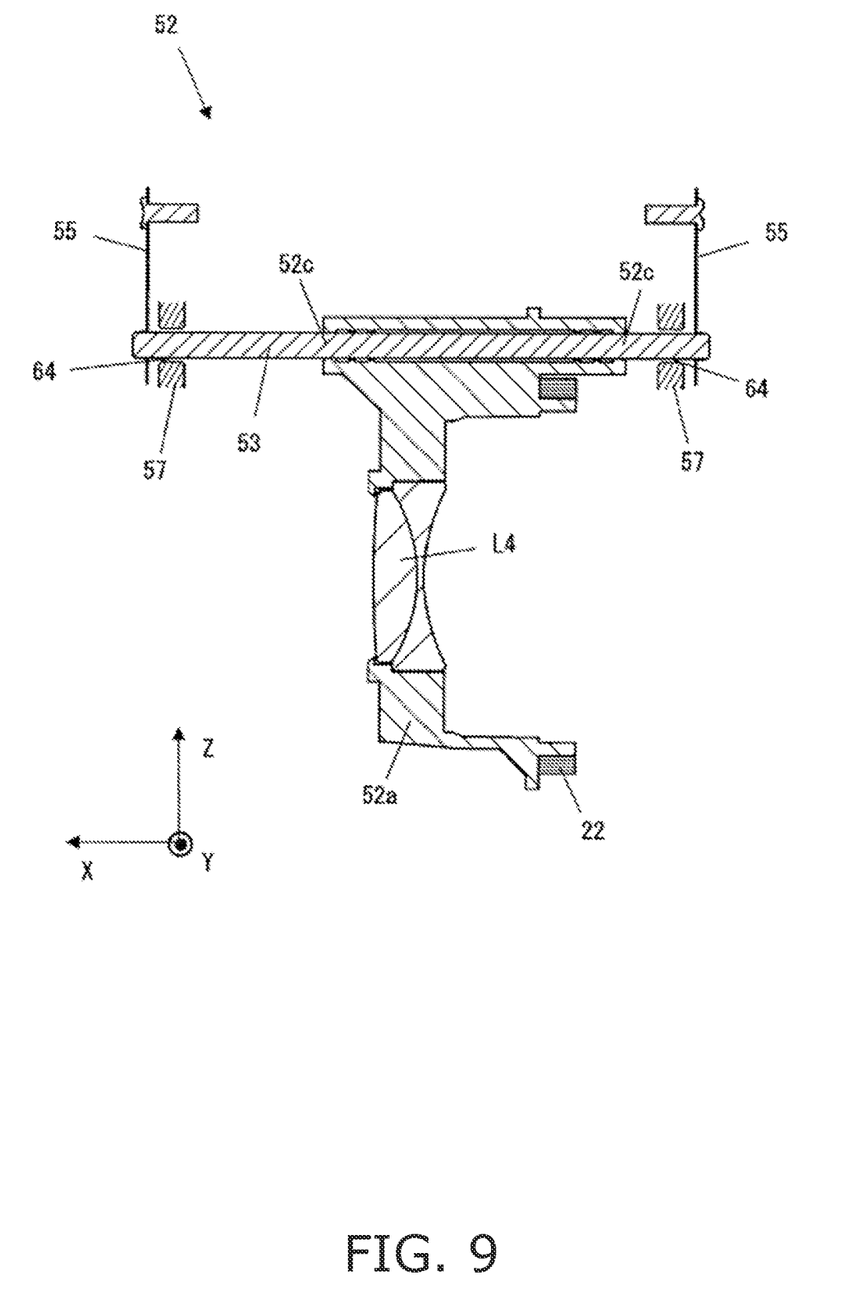
FIG. 9 is a cross section of the configuration of the focus lens unit and the guide pole in another countermeasure according to Embodiment 1.

FIG. 1 is an oblique view of an imaging device 1 according to Embodiment 1. FIG. 2 is an exploded oblique view of a lens barrel 10 in the imaging device 1 according to the embodiment. FIG. 3 is a cross section of the lens barrel 10 according to the embodiment along the A-A line in FIG. 1. FIG. 4 is an oblique view of a focus unit 50 of the lens barrel 10 according to the embodiment. FIG. 5 is an exploded oblique view of the focus unit 50. FIG. 6 is a diagram showing the configuration of a focus lens unit (movable frame) 52 and a guide pole (shaft) 53. FIGS. 7A to 7C are oblique views of the shapes of various leaf springs. FIG. 8 is a cross section of the configuration of the focus lens unit 52 and the guide pole 53 in a countermeasure example according to Embodiment 1. FIG. 9 is a cross section of the configurations of the focus lens unit 52 and the guide pole 53 according to another countermeasure example according to Embodiment 1.

In FIG. 1, the X-axis direction (axial direction) is defined as a direction parallel to the optical axis J of the imaging device 1, the Y axis direction is defined as the horizontal direction, and the Z axis direction is defined as the vertically upper side. Also, the X axis positive direction side is defined as the subject side, and the X axis negative direction side is defined as the imaging element 14 side. In FIG. 1, the Y axis direction and the Z axis direction are not limited to the above because they will vary with the usage mode. The same applies to all the drawings from FIG. 1 on.

As shown in FIG. 1, for example, the imaging device 1 is a digital still camera. The imaging device 1 comprises an imaging device main body (main body portion) 2 and a lens barrel 10.

The imaging device main body 2 has an image processor, a system controller, a memory unit, a camera display unit, a camera operation unit, and so on.

As shown in FIGS. 1 and 3, the image processor converts a signal from an imaging element 14 (discussed below) into a video signal. The system controller controls the photographic operations, recording, and so forth of the entire imaging device 1. The memory unit includes a main memory of the imaging device main body 2 and a storage medium installed from the outside. The camera display unit is used for aiming at the subject during image capture, confirming setting changes, and checking a preview of captured images. The camera operation unit is used to perform photographic operations and setting changes.

As shown in FIGS. 1 and 2, the lens barrel 10 has a zoom mechanism. When image capture is not being performed, this lens barrel projects from the imaging device main body 2 in the X axis positive direction. Then, for image capture and when the zoom mechanism is to be operated, the lens barrel is played out in the X axis positive direction. The lens barrel 10 may be detachable from the imaging device main body 2. The lens barrel 10 comprises a fixed portion 11 and a moving portion 12.

As shown in FIGS. 1 and 3, the fixed portion 11 is fixed at one end (the X axis negative direction side) to the imaging device main body 2. The fixed portion 11 has an outer frame 20 inside of which a cam barrel 30, a straight frame 40, and a focus unit 50 are housed. In the outer frame 20, a holding base 13 formed at the bottom thereof holds the imaging element 14. The imaging element 14 is an element that captures an image through first to fifth lens groups L1 to L5, and is, for example, a CMOS image sensor or the like. The imaging element 14 photoelectrically converts the light from the subject and outputs a signal to the image processor. The holding base 13 of the imaging device main body 2 holds the imaging element 14. The holding base 13 is formed substantially in a disc shape, and holds the imaging element 14 in a state in which the imaging surface 14a of the imaging element 14 is perpendicular to the optical axis J.

As shown in FIGS. 2 and 3, the cam barrel 30 is disposed inside the outer frame 20, and rotates around the optical axis J. The fixed portion 11 has, for example, an actuator 15 in which a gear portion and a DC motor are integrated. The rotation of the DC motor is transmitted to the rotation of the cam barrel 30 via a gear portion that meshes with the output gear of the DC motor.

A plurality of cam grooves are formed on the inner surface side and the outer peripheral side of the cam barrel 30. Also, a driven gear portion that meshes with the gear portion of the actuator is provided along the circumferential direction to the end of the cam frame and the outer peripheral surface on the X axis negative direction side.

The straight frame 40 is formed in a cylindrical shape and is disposed inside the cam barrel 30. The straight frame 40 is provided with a plurality of straight grooves and guide shafts. The straight grooves and guide shafts support a first lens group unit 17, a second lens group unit 80, a shutter unit 70, and a third lens group unit 60 so as to be movable in the optical axis direction.

The first lens group unit 17, the second lens group unit 80, the shutter unit 70, and the third lens group unit 60 are each provided with cam pins that engage with the plurality of cam grooves provided to the cam barrel 30. The cam grooves of the cam barrel 30 constitute a cam mechanism for moving the straight frame 40 rectilinearly in response to rotation.

Consequently, when the DC motor is rotated, the positions of the first lens group unit 17, the second lens group unit 80, the shutter unit 70, and the third lens group unit 60 change in the optical axis direction to perform zooming.

As shown in FIGS. 4 and 5, the focus unit 50 has a holding frame (support frame) 51, a lens group L5, a focus lens unit 52, a guide pole 53, an auxiliary guide pole 54, and a guide cover 150.

The holding frame (support frame) 51 is a resin member formed in a substantially cylindrical shape, for example, and is open on the X axis positive direction side. The holding frame 51 holds the fifth lens group L5 in its interior. The fifth lens group L5 is positioned by the holding frame 51. The fifth lens group L5 is disposed so that the optical axis of the fifth lens group L5 substantially coincides with the optical axis J of the imaging element 14. The fifth lens group L5 is located to the X axis positive direction side of the imaging element 14, and is provided so as to be opposite the imaging surface 14a of the imaging element 14.

As shown in FIG. 5, an accommodation space 51b for accommodating a drive mechanism (actuator) composed of a magnetic circuit having a yoke 21, a coil 22, and a drive magnet 23 is formed inside the holding frame 51.

That is, with the lens barrel 10 in this embodiment, a drive mechanism composed of a magnetic circuit having the yoke 21, the coil 22, and the drive magnet 23 constitutes an actuator that moves the focus lens unit 52 back and forth along the guide pole 53.

The yoke 21 has a substantially U-shaped cross section, and is disposed along the inner peripheral surface of the holding frame 51. The yoke 21 has a length substantially equal to the thickness of the holding frame 51 in the X axis direction. In the yoke 21 is formed an accommodation space 21a that is recessed in the X axis negative direction from the end surface of the yoke 21 on the X axis positive direction side.

The coil 22 is provided to the focus lens frame 52a and is disposed in the accommodation space 21a of the yoke 21.

The coil 22 is supplied with electric power from a power supply. The supply of electric power may be transmitted through flexible wiring.

The drive magnet 23 is provided on the outer peripheral side of the coil 22 so as to run along the inner peripheral surface of the yoke 21. The surface on the inner peripheral side of the drive magnet 23 is the north pole, and the surface on the outer peripheral of the drive magnet 23 is the south pole. Here, the drive magnet 23 is disposed so that a magnetic flux is generated in a direction perpendicular to the direction in which the coil 22 is energized. Consequently, a Lorentz force is exerted on the coil 22, with this force acting in the X axis direction. As a result, the focus lens unit 52 can be moved along the X axis direction.

In this embodiment, the magnet 58 is used as an example of a position sensing member, but the position sensing member may instead be a reflecting mirror, for example.

As shown in FIGS. 4 and 5, the focus lens unit 52 is movable along the X axis direction. The focus lens unit 52 has a focus lens frame 52a, a lens group L2, and a magnet 58 (an example of a position sensing member). Also, the holding frame 51 has an MR (magneto-resistive) element 59 (an example of a position sensor). The focus lens frame 52a is formed in a substantially cylindrical shape, and holds in its interior the focus lens group L4 to the X axis positive direction side of the holding frame 51. The focus lens group L4 is provided so as to be opposite the fifth lens group L5 to the X axis positive direction side of the fifth lens group L5 so that the optical axis of the focus lens group L4 substantially coincides with the optical axis J of the imaging element. A pole insertion hole 52c through which the guide pole 53 is inserted is formed in the focus lens frame 52a. Also, the auxiliary guide pole 54 is fixed to the holding frame 51 so that the focus lens unit 52 can move rectilinearly in the X axis direction. In this embodiment, the MR element 59 is used as an example of a position sensor, but a Hall element may be used as an example of a position sensor instead of the MR element 59.

As shown in FIG. 5, the MR magnet 58 is provided to the focus lens frame 52a near the MR element 59. When the focus lens frame 52a provided with the MR magnet 58 moves, the MR element 59 detects a change in the magnetic field produced in the MR magnet 58.

The MR element 59 is a sensor for sensing the position of the focus lens unit 52, and is provided to the holding frame 51. When the focus lens unit 52 is moved, such as when an image is being captured, for example, the position of the MR magnet 58 changes with respect to the MR element 59. At this point, the magnetic flux changes at the position of the MR element 59, and the output of the MR element 59 also changes. Thus sensing the output of the MR element 59 allows the shift position of the focus lens unit 52 to be sensed. A magnetic MR element 59 or a Hall element may be used as the position sensor, or a reflection type of photo-interrupter may be used. The supply of electric power may be transmitted through flexible wiring.

As shown in FIG. 4, the guide pole 53 and the auxiliary guide pole 54 are, for example, cylindrical metal members, and extend substantially parallel to the X axis direction. The guide pole 53 and the auxiliary guide pole 54 support the focus lens frame 52a movably in the X axis direction. In other words, the guide pole 53 and the auxiliary guide pole 54 guide the focus lens unit 52 so as to move along the optical axis J. One end (the X axis negative direction side) of the guide pole 53 and the auxiliary guide pole 54 is held by the holding frame 51 of the focus unit 50, and the other end (the X axis positive direction side) of the guide pole 53 and the auxiliary guide pole 54 is held by the guide cover 150.

The guide cover 150 is a cover member made of a resin, and is provided to the end of the focus unit 50 on the X axis positive direction side. More specifically, the guide cover 150 is fixed (held) to the end of the holding frame 51 on the X axis positive direction side (the subject side).

FIG. 6 is an explanatory diagram in which the portion of FIG. 4 pertaining to the main feature of this embodiment has been extracted.

In FIG. 6, the focus lens unit (movable frame) 52 is supported by the guide pole (shaft) 53 and the auxiliary guide pole 54. The guide pole 53 is inserted into the pole insertion hole 52c in the focus lens unit 52 to restrict the inclination of the focus lens unit 52 with respect to the optical axis J. Also, the auxiliary guide pole 54 restricts the rotation of the focus lens unit 52 around the optical axis J. Consequently, the focus lens unit 52 moves only in the optical axis direction (X axis direction) while maintaining its orientation with respect to the optical axis J.

Furthermore, both ends of the guide pole 53 are fixed to leaf springs (support portions) 55. The leaf springs 55 are fixed to the base with screws.

The leaf springs 55 are formed from a stainless steel plate material, as shown in FIG. 7A. The two leaf springs 55 are the same leaf spring and are fixed to both ends of the guide pole 53 substantially in parallel with each other.

With this configuration, the guide pole 53 can be guided substantially parallel to the X direction. The parallel leaf springs (leaf springs 55) have extremely good response characteristics at a small amplitude because slipping or other such friction does not act on the mechanism.

The term "small amplitude" here means an amplitude that is less than the stroke when the focus lens unit (movable frame) 52 is moved (more specifically, an amplitude of about 1 mm or less (that is, a movable range of about 2 mm or less)).

Grease is applied to the guide pole 53 and the pole insertion hole 52c of the focus lens unit 52. This grease serves to reduce friction between the guide pole 53 and the pole insertion hole 52c.

With the above configuration, when the focus lens unit 52 is driven, the guide pole 53 and the focus lens unit 52 move together in response to a small amplitude, and the guide pole 53 slides through the pole insertion hole 52c of the focus lens unit 52 in response to a large amplitude.

Thus using both a small-amplitude guide mechanism and a large-amplitude guide mechanism affords a guide mechanism with which positioning can be performed at a fine pitch, while still allowing large-amplitude movement.

The following shows conditions for further improvement based on the above configuration.

A first point will describe the shape of the leaf springs.

The parallel leaf spring mechanism (leaf springs 55a) shown in FIG. 7A has extremely good response characteristics at a small amplitude, but when the amount of movement is large, the discrepancy between the trajectory of the guide pole 53 and the X direction can no longer be ignored, and there is a problem in that there is deviation in the Y direction and the Z direction.

FIGS. 7B and 7C are examples of parallel leaf springs designed to deal with the above problem.

In FIG. 7B, the leaf springs 55b are in point symmetry around the connecting portion to which the guide pole 53 is fixed. The leaf springs 55b are fixed at the distal end of an arc-shaped bent portion, from the portion to which the guide pole 53 is fixed, via the bent portion.

In FIG. 7C, the leaf springs 55c have a circular shape centered on the guide pole fixing portion. The leaf springs 55c are provided with a plurality of concentric arc-shaped slits, and the outer peripheral side is fixed.

As shown in FIGS. 7B and 7C, if the shape of the leaf springs 55b and the leaf springs 55c is in point symmetry around the connecting portion with the guide pole 53, force will be evenly applied in the Y direction and the Z direction when the guide pole 53 is displaced in the X direction, so the trajectory of the guide pole 53 will be less likely to deviate in the Y direction and the Z direction.

A second point will describe the resonance of the spring-mass system.

In the configuration of this embodiment, the leaf springs 55 and the guide pole 53, and the leaf springs 55, the guide pole 53, and the focus lens unit 52 have the resonance frequency of the spring-mass system.

Accordingly, when the focus lens unit 52 is driven at a frequency near the resonance frequency, it starts vibrating, and in a worst case, it may oscillate and to the point of being uncontrollable.

FIG. 8 is an explanatory diagram of a countermeasure example.

The configuration in FIG. 8 is substantially the same as that in FIG. 6, differing from the configuration in FIG. 6 only in that damping members 56 are attached to the leaf springs 55. The damping members 56 are made of rubber, an elastomer, or another such material. The damping members 56 absorb the vibration of the leaf springs 55 and convert it into thermal energy. Therefore, the damping members 56 serve to attenuate the vibration of the leaf springs 55, and have the effect of suppressing oscillation.

FIG. 9 is an explanatory diagram of another countermeasure example.

The configuration in FIG. 9 is substantially the same as that in FIG. 6, but differs from the configuration in FIG. 6 in that the guide portion 57 is provided with a clearance between it and the guide pole 53.

Grease (fluid) 64 is injected into the clearance formed between the guide pole 53 and the guide portion 57.

That is, the guide pole 53 has a portion that goes through the guide portion (support frame) 57 with a clearance in between, and the grease 64 is injected into this clearance.

When the guide pole 53 moves, friction produced by the viscosity of the grease 64 is exerted, so the vibration is converted into thermal energy. Therefore, the configuration shown in FIG. 9 acts as a vibration damping portion that attenuates the vibration of the guide pole 53 in the X axis direction, and has the effect of suppressing oscillation.

Also, in the configuration in FIG. 9, when a limitation is imposed on the movement of the guide pole 53, even if an external force is exerted, such as when the device is dropped, any excessive force will be exerted on the leaf springs 55, thereby preventing the leaf springs 55 from being plastically deformed, or any fixed parts from coming off.

Although a configuration in which the grease 64 is injected into the clearance portion was described above, the same effect can be obtained by injecting some other fluid, such as oil or a magnetic fluid.

In the above embodiment, the vibration damping members 56 or the grease 64 was used as a vibration damping portion to attenuate the vibration of the guide pole 53 in the X axis direction, but it is also possible to use a method involving an eddy current type of brake or another such vibration attenuating portion, or a method involving a plurality of vibration damping portions used in combination, or another such method.

Embodiment 2

In Embodiment 1, leaf springs were used to support the guide pole so as to be movable at a small amplitude, but it is also possible to support the guide pole by some other method.

Figure 10:
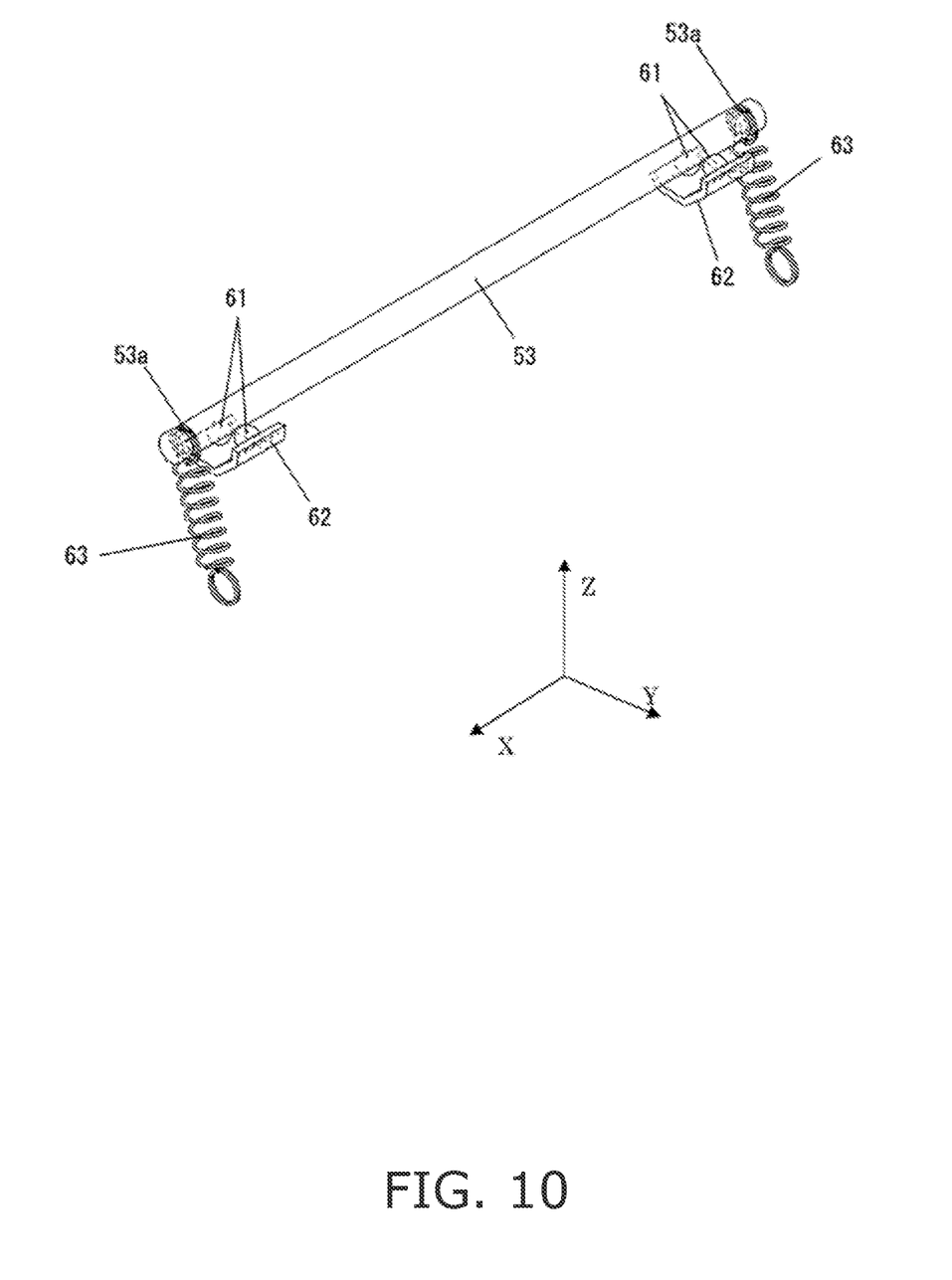
FIG. 10 is a diagram showing another guide pole support mechanism.

FIG. 10 is an explanatory diagram showing a guide pole support mechanism in this embodiment.

In FIG. 10, the guide pole 53 is supported in a rolling fashion by four ceramic balls (support portions, spheres) 61.

The ceramic balls 61 roll on a guide plate 62 that is fixed to the holding frame 51, and are supported in a state of being in contact with the guide pole 53 on the opposite side from the guide plate 62.

Grooves 53a are formed at both ends of the guide pole 53. Tension springs 63 are hooked in the grooves 53a, so that the guide pole 53 is pressed toward the guide plate 62.

With this configuration, since rolling friction is far lower than sliding friction and the like, the same effect as with support by leaf springs described in Embodiment 1 can be obtained.

Also, when supported is provided by spheres such as the ceramic balls 61, the rigidity is higher than when support is provided by leaf springs, and stable operation is possible even when vibration is applied from the outside.

In addition, in the above Embodiments 1 and 2, an example was described of providing a mechanism that supports the guide pole 53 movably at a small amplitude in the axial direction.

Although not depicted, the same effect can be obtained when the guide pole 53 is fixed, the focus lens frame 52a is divided into a lens fixing portion and a pole insertion hole 52c portion, and a mechanism that provides movable support at a small amplitude in the axial direction is provided between the lens fixing portion and the pole insertion hole 52c portion.

However, that provides movable support at a small amplitude in the axial direction is provided between the lens fixing portion and the pole insertion hole 52c portion, the moving portion becomes larger and the mass heavier. Therefore, the degree of latitude in disposition within the lens barrel is reduced as compared to when a mechanism is provided that supports the guide pole movably in the axial direction at a small amplitude. Alternatively, responsiveness in control may be inferior. Therefore, it is preferable to provide a mechanism that supports the guide pole 53 movably in the axial direction at a small amplitude.

Embodiments 1 and 2 were described above as examples of the technology involved in the present disclosure. The accompanying drawings and detailed description are provided to that end.

Therefore, the constituent elements shown in the attached drawings and described in the detailed description can include not only those constituent elements that are essential for solving the problem, but also constituent elements that are not essential for solving the problem, in order to exemplify the above technology. Therefore, the fact that these non-essential constituent elements are shown in the accompanying drawings or described in the detailed description should not lead to the conclusion that these non-essential constituent elements are in fact essential.

Also, since the above embodiments are used to exemplify the technology involved in the present disclosure, various modifications, substitutions, additions, omissions, and so forth can be made within the scope of claims or the equivalent thereof.

In view of this, another embodiment will be given below.

Other Embodiment

In Embodiments 1 and 2, as an example of an actuator, the actuator was described which drove a movable frame (the focus lens unit 52) by a Lorentz force generated in the coil 22 by using the drive magnet 23 and the coil 22. The actuator may be configured in any way, so long as the movable frame moves relatively in the axial direction. Also, the actuator may be one that drives the movable frame in the axial direction by using a rack mechanism and a stepping motor with a lead screw.

INDUSTRIAL APPLICABILITY

The lens barrel disclosed herein has the effect of allowing both high-precision positioning at a fine pitch, and high-speed, large-amplitude movement, and therefore can be broadly applied to imaging devices that capture images of a subject.

REFERENCE SIGNS LIST

1 imaging device
2 imaging device main body (main body portion)
10 lens barrel
11 fixed portion
12 moving portion
13 holding base
14 imaging element
14*a* imaging surface
15 actuator
17 first lens group unit
20 outer frame
21 yoke
21*a* accommodation space
22 coil
23 drive magnet
30 cam barrel
40 straight frame
50 focus unit
51 holding frame (support frame)
51*b* accommodation space
52 focus lens unit (movable frame)
52*a* focus lens frame
52*c* pole insertion hole
53 guide pole (shaft)
53*a* groove
54 auxiliary guide pole
55 leaf spring (support portion)
56 damping member (vibration attenuating portion)
57 guide portion
58 MR magnet (position sensing member)
59 MR element (position sensor)
60 third lens group unit
61 ceramic ball (support portion, sphere)
62 guide plate
63 tension spring
64 grease (fluid, vibration attenuating portion)
70 shutter unit
80 a second lens group unit
150 guide cover
L1 to L3, L5 lens groups
L4 focus lens group

The invention claimed is:

1. A lens barrel, comprising:
a support frame;
a shaft;
a movable frame configured to be slidably guided by the shaft and moves in an axial direction;
an actuator configured to move the movable frame relative to the support frame in the axial direction; and
support portions configured to support the shaft passively along with the movement of the movable frame and to permit movement of the shaft with respect to the support frame in the axial direction at a non-zero amplitude of about 1 mm or less.

2. The lens barrel according to claim 1,
wherein the support portions are leaf springs.

3. The lens barrel according to claim 2,
wherein the leaf springs are fixed to both ends of the shaft so as to be parallel to each other.

4. The lens barrel according to claim 3,
wherein the leaf springs have a shape that is in point symmetry around a connecting portion with the shaft.

5. The lens barrel according to claim 2,
further comprising damping members that are fixed to the leaf springs.

6. The lens barrel according to claim 1,
wherein the support portions include balls that roll and support the shaft.

7. The lens barrel according to claim 1,
further comprising a vibration damping portion configured to damp vibration of the shaft in the axial direction.

8. The lens barrel according to claim 1,
wherein the shaft has a portion that passes through the support frame with clearance left, and a fluid is injected into this clearance.

9. An imaging device, comprising:
the lens barrel according to claim 1; and
a main body to which the lens barrel is mounted.

10. The lens barrel according to claim 1, wherein the support portions are at least one of springs which elastically deform or rollers which roll, to permit the movement of the shaft with respect to the support frame in the axial direction.

11. A lens barrel, comprising:
a support frame;
a shaft;
a movable frame configured to be slidably guided by the shaft and moves in an axial direction;
an actuator configured to move the movable frame relative to the support frame in the axial direction; and
support portions configured to support the shaft on both sides of the shaft in a longitudinal direction and to permit movement of the shaft with respect to the support frame in the axial direction at a non-zero amplitude of about 1 mm or less.

12. A lens barrel, comprising:
a support frame;
a shaft;
a movable frame configured to be slidably guided by the shaft and moves in an axial direction;
an actuator configured to move the movable frame relative to the support frame in the axial direction; and support portions that are configured to support the shaft in the axial direction and to permit movement of the shaft with respect to the support frame in the axial direction at a non-zero amplitude of about 1 mm or less.

* * * * *